United States Patent Office 3,833,627
Patented Sept. 3, 1974

3,833,627
ALUMINUM POLYGLYCERYL FATTY ACID ESTERS
Martin M. Rieger, Morris Plains, N.J., assignor to Warner-Lambert Company, Morris Plains, N.J.
No Drawing. Filed Oct. 5, 1972, Ser. No. 296,362
Int. Cl. A61k 27/00; C07f 5/06
U.S. Cl. 260—410.6      4 Claims

ABSTRACT OF THE DISCLOSURE

Aluminum polyglyceryl fatty acid esters having prolonged acid neutralization characteristics and anti-foam activity.

---

The present invention relates to aluminum polyglyceryl fatty acid esters which are useful as antacids having prolonged neutralization characteristics coupled with anti-foam activity. The compounds of the present invention are prepared by reacting polyglyceryl fatty acid esters with at least one unesterified hydroxyl group with aluminum isopropoxide.

Many aluminum compounds, particularly aluminum hydroxide and various compositions including it, are well-known for their capacity to neutralize hydrochloric acid. This property combined with its innocuousness to the human body has given rise to its widespread use as an antacid.

It has been noted that despite its more desirable aspects, aluminum hydroxide, which is usually in the form of a gel when used as an antacid, upon drying tends to lose some of its acid-consuming power. Various compounds have been prepared which will yield aluminum hydroxide upon ingestion such as a polymeric aluminum hydroxide-hexitol complex. The object of preparing such compounds is to improve the stability and shelf life with respect to the antacid properties.

The present invention is directed to providing compounds which are aluminum hydroxide derivatives which have good acid-consuming power, prolonged antacid activity, low toxicity and anti-foam capability.

One of the objects of the present invention is to provide aluminum antacid compounds which, in addition to their acid-consuming properties, also act to break such foam as may be present.

This latter property obviates the necessity of including a defoaming compound such as Dimethicone in antacid compositions in which the compounds of the present invention would be included. It is also apparent that the antacid-antifoaming compounds of the present composition may be included as a constituent of antacid compositions which may contain as a major portion conventional antacid compounds.

The products of the present invention are particularly useful in combination with antacid compounds whose acid-consuming power is much greater. They are compatible with aluminum carbonate, aluminum hydroxide, calcium carbonate, calcium hydroxide, magnesium carbonate and the like. They are less hygroscopic than aluminum hydroxide. They are quite stable in such combinations or alone. They have less tendency than aluminum isopropoxide to form aluminum hydroxide.

The compounds of the present invention, which are aluminum alkoxides of polyglyceryl fatty acid esters are prepared by reacting suitable polyglyceryl esters with aluminum isopropoxide in about equimolar amounts by refluxing them at moderately elevated temperatures for several hours. The polyglyceryl esters and aluminum isopropoxide are preferably dissolved in a chemically inert solvent such as xylene, the boiling point of which determines the reflux temperature.

The following examples are given here by way of illustration and not by limitation.

EXAMPLE I

Aluminum Derivative of Triglycercyl-monostearate

Triglycerylmonostearate (50.6 g.; 0.1 mol) and aluminum isopropoxide (20.4 g.; 0.1 mol) were charged into a round bottom flask which was provided with a heater and a reflux condenser. The reflux condenser may be further provided with a drying tube containing calcium chloride to protect the aluminum isopropoxide. The two reactants were dissolved in 100 ml. of xylene. The flask which was magnetically stirred was heated to reflux temperature (about 139° C.). The refluxing and stirring continued for 12 hours.

The reflux column was removed. Heating the flask was continued and the solvent was distilled off. The residue remaining in the flask was mixed with about 300 to 400 ml. of acetone (reagent grade). The flask contained a cream-colored solid mixed with acetone. The acetone was removed by filtering with suction. The cream-colored solid which was recovered with dried in vacuo at 40° C.

The acid consuming power of the aluminum triglycerylmonostearate thus produced was determined by dispersing 1 gram in distilled water and takeng readings with a pH meter while a titration with 0.1 $N$ hydrochloric acid is carried out.

The number of mls. of acid used to stabilize the pH of the solution at 3.0 is the acid consuming power. The number of ml. per g. of material required to reach a stable pH of 3.0 was 65.

Other polyhydroxy polyglyceryl aluminum compounds may be prepared in similar fashion.

EXAMPLE II

Aluminum Derivative of Triglyceryl Monooleate

Aluminum isopropoxide (20.6 g.; 0.1 mol) was dissolved in 70 ml. of hot xylene. To this solution was added triglyceryl monooleate (50.4 g.; 0.1 mol) which was itself dissolved in 70 ml. of hot xylene. The solution was refluxed between 3 and 4 hours. The heating was discontinued and the reaction vessel allowed to cool to room temperature. The solid which formed in the solvent was recovered by filtering the mixture with suction. The solids were then washed with acetone. The recovered material was almost white, appeared to be crystalline and was found to contain 8.75% aluminum by weight. When tested by the method previously described, its acid consuming power was found to be 58.

A somewhat more complex compound was obtained in the following manner.

EXAMPLE III

Hexaglyceryl distearate (50 g.; 0.05 mol) and aluminum isopropoxide (10.3 g.; 0.05 mol) were mixed dry and ground until the mixture was uniform. The mixture was added to 250 ml. of xylene. The solution was refluxed 12 hours, while being stirred with a magnetic stirrer. The reflux condenser was then removed, the heating continued to remove all but 50 ml. of xylene and the vessel allowed to cool to room temperature. Acetone was added in several portions each time with shaking until a finely dispersed solid was observed. The finely divided solid was filtered out of solution and dried in a vacuum oven at 40° C.

The exact structure of the aluminum compounds produced in these examples could not be accurately determined. The ratio of reactants, though equimolar, is probably not stoichiometrically equivalent. The triglyceryl monoesters have four available hydroxy groups in each mol, while one mol of aluminum isopropoxide can only satisfy three hydroxyl groups. The result of reacting less than a stoichiometrically equivalent amount of aluminum isopropoxide is the complete consumption of this compound. The by-product isopropyl alcohol, which has a boiling point of 82° C., is removed during the process or shortly subsequent thereto by simply boiling off. This insures an end product free from impurities.

Applicant, while not wishing to be bound by the following explanation of the manner in which the compounds of his invention operate, believes that when contracted by gastric juices they hydrolyze to form aluminum hydroxide, *in situ*. The nascent aluminum hydroxide present in the stomach is in an extremely high degree of subdivision and, therefore, has a rapid onset of antacid action and great efficiency. The antacid action is more rapid and complete than that of conventional tablet antacids and the polyglyceryl ester released by the hydrolysis of the compounds of the present invention operates to break such foams that may be present. This latter feature also aids in removing the discomfort of gastric distress by relieving symptoms of flatulence.

The product of Example II was evaluated to determine whether it possessed antifoaming properties. The procedure was as follows: A stock solution (A) consisting of 100 ml. HCl (1N), 0.5 g. Tween 80 (polyoxylethylene sorbitan monooleate), and water sufficient to bring the composition to 1000 ml. was prepared. A second stock solution (B) consisting of the same materials was prepared but contained, in addition, 2 g. of cellulosic gum. The purpose of this second solution was to determine what effect an increase in viscosity in the test solution would have on the ability of the compounds to reduce or eliminate foaming.

200 ml. of the test solution was placed in a 1000 ml. graduate cylinder. Compressed air was bubbled through the solution by means of a gas diffuser stone at constant flow rate and pressure. Air was bubbled for 18 sec. at a pressure of 10 p.s.i. and a flow rate of 1150 ml. per minute at room temperature. The volumes of foam only were measured immediately upon stopping the bubbling and again at 5 minutes after the start of aeration. If the foam disappeared in less than 5 minutes that time was noted. Controls were run on both solutions A and B. The compound of Example II, aluminum triglyceryl monooleate, is added to 200 ml. before aeration, as is 0.2 ml. of peppermint oil, a recognized carminative, to solutions A and B. The final volume of stock solution plus addiitve is 200 ml. It is placed in the graduate cylinder prior to placing the aerator in the cylinder. The results are given in terms of milliliters of foam remaining above any liquid when the reading is taken. High foam readings resulted in nearly complete consumption of the foamable liquid.

The procedure in each test was as previously described. The following results were obtained:

| Test | Foam volume at end of aeration, ml. | Foam at time from start of aeration |
|---|---|---|
| 1 ----- A alone | 920 | 740 ml. at 5 min. |
| 2 ----- A+0.5 g. aluminum triglyceryl monooleate | 310 | 0 at 0.6 min. |
| 3 ----- A+0.2 ml. peppermint oil | 950 | 50 ml. at 5 min. |
| 4 ----- B alone | 900 | 450 ml. at 5 min. |
| 5 ----- B+0.5 g. aluminum triglyceryl monooleate | 550 | 15 ml. at 1.25 min. |
| 6 ----- Composition of Test 5 reaerated after ½ hour | 650 | 20 ml. at 1.5 min. |
| 7 ----- B+0.2 ml. peppermint oil | 700 | 20 ml. at 2.5 min. |

These tests show that a representative aluminum derivative of a polyglyceryl fatty acid ester possesses significant anti-foaming properties in addition to the acid consuming power already disclosed.

The oral $LD_{50}$ of aluminum triglyceryl monooleate was determined to be greater than 5 g./kg. in mice.

The specific embodiments set forth above have been given by way of exemplification and not by way of limitation. It will be recognized by those skilled in the chemical arts that other polyglyceryl fatty acid esters and fatty acid esters of other polyhydroxy compounds such as carbohydrates when reacted with aluminum isopropoxide can be expected to yield similar products. A large number of safe and useful antacids possessing anti-foaming properties can be prepared in accordance with the teaching of the present invention.

What is claimed is:

1. The products obtained by dissolving polyglyceryl fatty acid esters selected from the group consisting of triglycerylmonostearate, triglycerylmonooleate, and hexaglyceryl distearate, in xylene, adding about an equimolar amount of aluminum isopropoxide to the xylene, stirring and heating the mixture to its reflux temperature, concentrating the reaction mixture, cooling the reaction mixture, and recovering the product of the reaction.

2. The product as set forth in Claim 1 wherein the polyglyceryl fatty acid ester is triglycerylmonostearate.

3. The product as set forth in Claim 1 wherein the polyglyceryl fatty acid ester is triglyceryl monooleate.

4. The product as set forth in Claim 1 wherein the polyglyceryl fatty acid ester is hexaglyceryl distearate.

References Cited

UNITED STATES PATENTS

| 3,686,249 | 8/1972 | Hartmann | 260—448 AD |
| 3,579,634 | 5/1971 | Brown | 424—154 |

LEWIS GOTTS, Primary Examiner

D. G. RIVERS, Assistant Examiner

U.S. Cl. X.R.

424—154, 312